(12) United States Patent
Von Hatten et al.

(10) Patent No.: US 8,970,873 B2
(45) Date of Patent: Mar. 3, 2015

(54) SYSTEM AND METHOD FOR MANAGING PRINTER RESOURCES ON AN INTERNAL NETWORK

(75) Inventors: Philip Von Hatten, Kitchener (CA); Patrick Pidduck, Waterloo (CA); Rob Evers, Waterloo (CA); Frank Kavanaugh, Burlington (CA); Mike Sobiski, Kitchener (CA); Brian Hollander, Kitchener (CA); Mei Zhou, Waterloo (CA); Justin Turner, Guelph (CA); Mark Onischke, Kitchener (CA); Michael Kuindersma, Conestoga (CA); Dharmesh Krishnammagaru, Kitchener (CA); Michael St. Laurent, Baden (CA)

(73) Assignee: Printeron Inc., Kitchener (CA)

( * ) Notice: Subject to any disclaimer, the term of this patent is extended or adjusted under 35 U.S.C. 154(b) by 1063 days.

(21) Appl. No.: 12/884,743

(22) Filed: Sep. 17, 2010

(65) Prior Publication Data

US 2012/0069385 A1    Mar. 22, 2012

(51) Int. Cl.
*G06F 3/12* (2006.01)
(52) U.S. Cl.
CPC ............ *G06F 3/1288* (2013.01); *G06F 3/1203* (2013.01); *G06F 3/1224* (2013.01); *G06F 3/1232* (2013.01)
USPC ........................................................ 358/1.15
(58) Field of Classification Search
None
See application file for complete search history.

(56) References Cited

U.S. PATENT DOCUMENTS

| | | | |
|---|---|---|---|
| 5,220,674 A | 6/1993 | Morgan et al. |
| 5,580,177 A | 12/1996 | Gase et al. |
| 5,696,898 A | 12/1997 | Baker et al. |
| 5,727,159 A | 3/1998 | Kikinis |
| 5,764,235 A | 6/1998 | Hunt et al. |
| 5,825,759 A | 10/1998 | Liu |
| 5,826,062 A | 10/1998 | Fake et al. |
| 5,872,926 A | 2/1999 | Levac et al. |

(Continued)

FOREIGN PATENT DOCUMENTS

| | | |
|---|---|---|
| CA | 2401738 A1 | 9/2001 |
| DE | 1 435 565 | 7/2004 |

(Continued)

OTHER PUBLICATIONS

International Search Report, PCT Application No. PCY/CA2011/000991, mailed Dec. 19, 2011 (3 pages).

(Continued)

*Primary Examiner* — Jeremiah Bryar
(74) *Attorney, Agent, or Firm* — Occhiuti & Rohlicek LLP

(57) ABSTRACT

A system and method are provided for routing print requests and managing internal printer resource data on an internal network with global printer resource data stored on an external network. Print requests are received for printer resources and it is determined whether the request may be served with printer resource data stored on the internal network. If the printer resource data is invalid or stale, then printer resource data is requested from the global server and the internal printer resource data is updated. The print request is then routed to the appropriate printer resource based on location information in the printer resource data associated with the requested printer resource. Network client devices may also be configured to connect to a print traffic server when connected to an internal network, and to the global server otherwise.

18 Claims, 6 Drawing Sheets

(56) References Cited

U.S. PATENT DOCUMENTS

| | | | |
|---|---|---|---|
| 5,903,723 | A | 5/1999 | Beck et al. |
| 5,958,006 | A | 9/1999 | Eggleston et al. |
| 5,987,611 | A | 11/1999 | Freund |
| 6,049,711 | A * | 4/2000 | Ben-Yehezkel et al. ... 455/414.3 |
| 6,064,656 | A | 5/2000 | Angal et al. |
| 6,085,227 | A | 7/2000 | Edlund et al. |
| 6,088,451 | A | 7/2000 | He et al. |
| 6,092,114 | A | 7/2000 | Shaffer et al. |
| 6,128,644 | A | 10/2000 | Nozaki |
| 6,138,162 | A | 10/2000 | Pistriotto et al. |
| 6,148,336 | A | 11/2000 | Thomas et al. |
| 6,151,624 | A | 11/2000 | Teare et al. |
| 6,161,139 | A | 12/2000 | Win et al. |
| 6,178,505 | B1 | 1/2001 | Schneider et al. |
| 6,182,142 | B1 | 1/2001 | Win et al. |
| 6,202,156 | B1 | 3/2001 | Kalajan |
| 6,212,565 | B1 | 4/2001 | Gupta |
| 6,219,786 | B1 | 4/2001 | Cunningham et al. |
| 6,226,752 | B1 | 5/2001 | Gupta et al. |
| 6,233,618 | B1 | 5/2001 | Shannon |
| 6,308,273 | B1 | 10/2001 | Goertzel et al. |
| 6,317,838 | B1 | 11/2001 | Baize |
| 6,324,648 | B1 | 11/2001 | Grantges, Jr. |
| 6,336,124 | B1 | 1/2002 | Alam et al. |
| 6,345,288 | B1 | 2/2002 | Reed et al. |
| 6,345,300 | B1 | 2/2002 | Bakshi et al. |
| 6,349,336 | B1 | 2/2002 | Sit et al. |
| 6,360,252 | B1 | 3/2002 | Rudy et al. |
| 6,377,994 | B1 | 4/2002 | Ault et al. |
| 6,408,336 | B1 | 6/2002 | Schneider et al. |
| 6,438,585 | B2 | 8/2002 | Mousseau et al. |
| 6,438,586 | B2 | 8/2002 | Mousseau et al. |
| 6,442,541 | B1 | 8/2002 | Clark et al. |
| 6,445,824 | B2 | 9/2002 | Hieda |
| 6,453,353 | B1 | 9/2002 | Win et al. |
| 6,457,030 | B1 | 9/2002 | Adams et al. |
| 6,463,474 | B1 | 10/2002 | Fuh et al. |
| 6,490,624 | B1 | 12/2002 | Sampson et al. |
| 6,510,464 | B1 | 1/2003 | Grantges et al. |
| 6,513,061 | B1 | 1/2003 | Ebata et al. |
| 6,542,892 | B1 | 4/2003 | Cantwell |
| 6,549,949 | B1 | 4/2003 | Bowman-Amuah |
| 6,553,422 | B1 | 4/2003 | Nelson |
| 6,581,092 | B1 | 6/2003 | Motoyama et al. |
| 6,598,076 | B1 | 7/2003 | Chang et al. |
| 6,601,108 | B1 | 7/2003 | Marmor |
| 6,604,143 | B1 | 8/2003 | Nagar et al. |
| 6,606,660 | B1 | 8/2003 | Bowman-Amuah |
| 6,606,708 | B1 | 8/2003 | Devine et al. |
| 6,615,234 | B1 | 9/2003 | Adamske et al. |
| 6,662,228 | B1 | 12/2003 | Limsico |
| 6,681,392 | B1 | 1/2004 | Henry et al. |
| 6,687,732 | B1 | 2/2004 | Bector et al. |
| 6,690,481 | B1 | 2/2004 | Yeung et al. |
| 6,704,798 | B1 | 3/2004 | Mogul |
| 6,708,220 | B1 | 3/2004 | Olin |
| 6,718,328 | B1 | 4/2004 | Norris |
| 6,728,787 | B1 | 4/2004 | Leigh |
| 6,742,039 | B1 | 5/2004 | Remer et al. |
| 6,771,595 | B1 | 8/2004 | Gilbert et al. |
| 6,785,728 | B1 | 8/2004 | Schneider et al. |
| 6,829,646 | B1 | 12/2004 | Philyaw et al. |
| 6,885,860 | B2 | 4/2005 | Bahl et al. |
| 6,925,595 | B1 | 8/2005 | Whitledge et al. |
| 6,978,299 | B1 | 12/2005 | Lodwick |
| 6,981,045 | B1 | 12/2005 | Brooks |
| 7,037,198 | B2 | 5/2006 | Hameen-Anttila |
| 7,249,188 | B2 | 7/2007 | Spicer et al. |
| 7,904,594 | B2 | 3/2011 | Spicer et al. |
| 8,493,591 | B2 | 7/2013 | Kitagata |
| 2001/0044829 | A1 | 11/2001 | Lundberg |
| 2002/0016818 | A1 | 2/2002 | Kirani et al. |
| 2002/0066026 | A1 | 5/2002 | Yau et al. |
| 2002/0122201 | A1 | 9/2002 | Haraguchi |
| 2002/0143773 | A1 | 10/2002 | Spicer et al. |
| 2002/0155843 | A1 | 10/2002 | Bahl et al. |
| 2003/0030843 | A1 * | 2/2003 | Qiao ............................. 358/1.15 |
| 2003/0037126 | A1 | 2/2003 | Spicer et al. |
| 2003/0051038 | A1 | 3/2003 | Spicer et al. |
| 2003/0078965 | A1 | 4/2003 | Cocotis et al. |
| 2003/0079030 | A1 | 4/2003 | Cocotis et al. |
| 2003/0090694 | A1 * | 5/2003 | Kennedy et al. ............. 358/1.13 |
| 2003/0103226 | A1 | 6/2003 | Nishio |
| 2003/0191676 | A1 | 10/2003 | Templeton |
| 2003/0197887 | A1 | 10/2003 | Shenoy et al. |
| 2004/0125401 | A1 | 7/2004 | Earl et al. |
| 2004/0190049 | A1 | 9/2004 | Itoh |
| 2004/0249975 | A1 * | 12/2004 | Tuck et al. .................... 709/245 |
| 2004/0252337 | A1 * | 12/2004 | Takabayashi et al. ....... 358/1.15 |
| 2005/0085241 | A1 | 4/2005 | Bahl et al. |
| 2005/0255861 | A1 | 11/2005 | Wilson et al. |
| 2006/0168258 | A1 | 7/2006 | Spicer et al. |
| 2007/0076253 | A1 * | 4/2007 | Shima .......................... 358/1.15 |
| 2007/0234354 | A1 | 10/2007 | Hattori |
| 2008/0184162 | A1 | 7/2008 | Lindsey et al. |
| 2008/0193182 | A1 | 8/2008 | Sasama |
| 2008/0246988 | A1 | 10/2008 | Ashton |
| 2010/0094979 | A1 * | 4/2010 | Azami .......................... 709/221 |
| 2010/0095367 | A1 | 4/2010 | Narayanaswamy |
| 2010/0103453 | A1 | 4/2010 | Tsutsumi |

FOREIGN PATENT DOCUMENTS

| | | |
|---|---|---|
| DE | 1 460 529 | 9/2004 |
| EP | 1170920 | 1/2002 |
| EP | 1271302 A2 | 1/2003 |
| EP | 1435565 | 7/2004 |
| EP | 1460529 | 9/2004 |
| WO | 9836344 | 8/1998 |
| WO | 9840992 | 9/1998 |
| WO | 9922294 | 5/1999 |
| WO | 9965256 | 12/1999 |
| WO | 0011850 | 3/2000 |
| WO | 0122259 | 3/2001 |
| WO | 03019403 A2 | 3/2003 |

OTHER PUBLICATIONS

Extended European Search Report dated Feb. 4, 2014 issued from the European Patent Office relating to European Patent Application No. 11824385.6.

Extended European Search Report dated Feb. 5, 2014 issued from the European Patent Office relating to European Patent Application No. 11824383.1.

Liljeberg M. et al., "Enhanced Services for World-Wide Web in Mobile WAN Environment", Apr. 1, 1996, University of Helsinki, Department of Computer Science, Publication No. C-1996-28, Helsinki, Finland, XP002162553.

Zenel B. et al., "Intelligent Communication Filtering for Limited Bandwidth Environments", Workshop on Hot Topics in Operating Systems, May 4, 1995, pp. 28-34, XP002094011, p. 28, line 12-p. 34, line 11.

Australian Examination Report dated May 25, 2005 issued from the Australian Patent Office relating to Australian Patent Application No. 2001243980.

Canadian Office Action dated Aug. 7, 2012 issued from the Canadian Intellectual Property Office relating to Canadian Patent Application No. 2,301,996.

Canadian Office Action dated Jan. 5, 2011 issued from the Canadian Intellectual Property Office relating to Canadian Patent Application No. 2,301,996.

Canadian Office Action dated Jul. 16, 2008 issued from the Canadian Intellectual Property Office relating to Canadian Patent Application No. 2,301,996.

Sitao W. et al.: "Using Device Driver Software in Scada Systems" 2000 IEEE Power Engineering Society. Winter Meeting Conference Proceedings. Singapore, Jan. 23-27, 2000, IEEE Power Engineering Society Winder Meeting, New York, NY: right-hand column, paragraph 3, p. 2047, right-hand column, paragraph 1.

Qi Lu et al., "Efficient large-scale access control for Internet/intranet information systems", System Sciences, Proceedings of the 32nd Annual Hawaii International Conference on Volume, Jan. 5-8, 1999, p. 9pp.

(56) References Cited

OTHER PUBLICATIONS

Hiltunen et al., "Access control in wide-area networks", Distributed Computing Systems, Proceedings of the 17th International Conference, May 27-30, 1997 pp. 330-337.

Johnston et al., "Authorization and attribute certificates for widely distributed access control", Enabling Technologies: Infrastructure for Collaborative Enterprises, Proceedings, Seventh IEEE International Workshops, Jun. 17-19, 1998, pp. 340-345.

Kumar et al., "Security management architecture for access control to network resources", Computers and Digital Techniques, IEE Proceedings—vol. 144, Issue 6, Nov. 1997, pp. 362-370.

International Search Report, PCT Application No. PCT/CA2011/000991 dated Dec. 19, 2011.

International Search Report, PCT Application No. PCT/CA2011/000994 dated Dec. 1, 2011.

Extended European Search Report dated Jan. 23, 2014 relating to European Patent Application No. 11824384.9.

Canadian Office Action dated Jul. 30, 2009 issued from the Canadian Intellectual Property Office relating to Canadian Patent Application No. 2,401,738.

Canadian Office Action dated Nov. 27, 2007 issued from the Canadian Intellectual Property Office relating to Canadian Patent Application No. 2,401,738.

Canadian Office Action dated Apr. 28, 2009 issued from the Canadian Intellectual Property Office relating to Canadian Patent Application No. 2,401,717.

Canadian Office Action dated Sep. 21, 2007 issued from the Canadian Intellectual Property Office relating to Canadian Patent Application No. 2,401,717.

Canadian Office Action dated Apr. 24, 2007 issued from the Canadian Intellectual Property Office relating to Canadian Patent Application No. 2,401,729.

Canadian Office Action dated Aug. 13, 2009 issued from the Canadian Intellectual Property Office relating to Canadian Patent Application No. 2,401,721.

Canadian Office Action dated Nov. 21, 2007 issued from the Canadian Intellectual Property Office relating to Canadian Patent Application No. 2,401,721.

Extended European Search Report dated May 13, 2011 relating to European Patent Application No. 10011973.4.

European Examination Report dated Feb. 26, 2013 relating to European Patent Application No. 10011973.4.

International Search Report, PCT Application No. PCT/CA2011/000992.

International Search Report, PCT Application No. PCT/CA2011/000993.

International Search Report, PCT Application No. PCT/CA2011/000995.

International Search Report, PCT Application No. PCT/CA2011/001295.

\* cited by examiner

SYSTEM AND METHOD FOR MANAGING PRINTER RESOURCES ON AN INTERNAL NETWORK

FIELD

The disclosed embodiments relate generally to accessing printer resources over a network, and more specifically to managing printer resources and routing printer requests where printer configuration data is stored on an external network.

INTRODUCTION

Local area networks ("LANs") have long been used for sharing resources among network client devices. A network client device may act as a print server to share a connected printer resource with other network client devices connected to the LAN. Generally, the configuration of the printer resources, print servers and network client devices are managed by a local system administrator. In a traditional LAN-based sharing setup, the system administrator must configure each print resource, print server and each of the possibly many network clients. In some setups, additional software may also be required for accounting and print management on both the network clients and print servers, resulting in additional configuration for the system administrator. Management of these traditional LAN-based printer sharing systems is difficult due to multiple settings being distributed among a number of devices.

With the ubiquity of wireless networks, laptops and mobile devices, such as cell phones, access to printer resources using LAN-based approaches are no longer feasible. There are too many devices for the system administrator to manage and the devices are often connected to a network segregated from the LAN to which the printer resource is connected.

Hosted printer configuration systems provided an improvement over LAN-based approaches that allowed access to a printer resource from devices that are not directly connected to the LAN. In hosted systems, the settings for the printer resources and network clients are hosted on a global configuration server thereby creating a single point for a systems administrator to manage the settings for each of the printer resources on their network. The server is connected to the internet so that network client devices can connect even if they are not directly connected to the LAN to which the printer is connected. The network clients are configured to connect with the server to retrieve printer configuration data so that the network client can access any configured printer resources on any network.

Although hosted printer configuration systems provide a simpler user experience, the approach suffers from a number of disadvantages. The main disadvantage of the hosted printer configuration system is that all requests must be routed over the internet to the configuration server. This results in increased internet bandwidth utilization and several connections to the configuration server. Because the hosted printer configuration system is dependent upon the internet connection and the configuration server's availability, if either are unavailable, the printer resources will also be unavailable through the system. In some cases the printer resource and network client may be located on the same LAN or internal network, but print requests are inefficiently routed over the internet. Hosting the printer configuration on the internet also results in slower performance since print requests must traverse the internet to the server and back. Also, accounting and reporting data is stored on internet making it more difficult to retrieve the data and integrate it with local accounting systems.

SUMMARY

Accordingly, there is a need for a system that use bandwidth more efficiently, provides improved performance and is not dependent on an internet connection to a global server. According to a first aspect, there is provided a method for routing print requests and managing internal printer resource data on an internal network wherein global printer resource data is stored on an external network. The method comprises receiving a print request for a printer resource, updating internal printer resource data with global printer resource data from a global server connected to the external network if internal printer resource data stored on the internal network that is associated with the requested printer resource is invalid, the global server having global printer resource data, and routing the print request to the requested printer resource based on location information in the printer resource data associated with the requested printer resource.

In another aspect, there is provided a method for accessing a printer resource on an internal network from a client network device. The method comprises sending a message to a print traffic server on the internal network from the client network device, if a reply to the message is received from the print traffic server, submitting the print request for the printer resource to the print traffic server, and if the reply to the message is not received from the print traffic server, attempting to submit the print request for the printer resource to a global server located on an external network.

In another aspect, there is provided a method for accessing a printer resource on an internal network from a client network device. The method comprises receiving location information of a client network device at a global print server on an external network, identifying a print traffic server that is accessible by the client network device through the internal network based on the location information, sending a connection information for the identified print traffic server to the client network device.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computer may be a server class computer having one or more processors and at least one network interface card where the processors execute program code to provide a service or data over a network connection. Program code may operate on input data to perform the functions described herein and generate output data.

Figure 1:
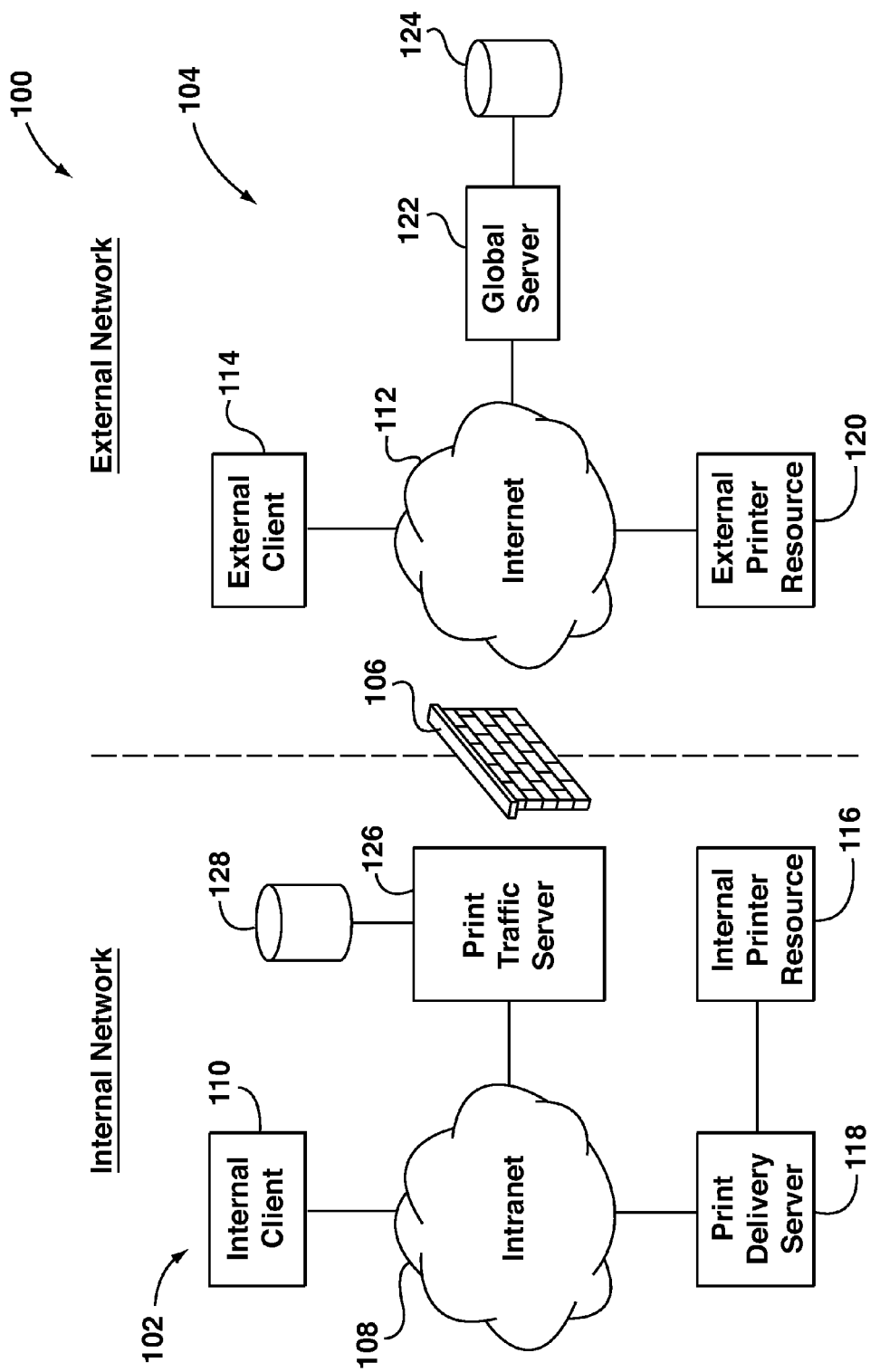
FIG. 1 is a block diagram of a network system with printer resources connected to both an internal and external network.

Referring to FIG. 1, a network system 100 is shown with internal network 102 and external network 104 separated by a firewall 106. Internal network 102 may be a private network that is used to connect network devices across an organization. For example, in a corporate setting the internal network may be comprised of a number of local area networks (LANs) at corporate sites that are interconnected by wide area network links that allow sharing of network resources throughout the corporation.

Another example of an internal network may include a university network that has a number of interconnected LANs and wireless LANs. The university may have multiple campuses that are interconnected by wide area network links. The traffic on the wireless LANs is usually segregated from other networks operated by the university for network security and administrative purposes.

Internal network 102 may be comprised of a number of physical network components such as routers, switches, servers, firewalls, network cabling and other network components (not shown). Although internal network 102 is generally a private network, wide area network links may include VPN tunnels through the internet or other private links over public networks. A number of services or overlay networks, such as virtual LANs, may be operated over the physical network components of internal network 102. Intranet 108 is provided as an example of a private network using the internet protocol that is operated over internal network 102.

Client network devices, such as internal network client 110, that are connected through intranet 108 may share or access network resources that are also connected to intranet 108. Client network devices may include any network device that can connect to internal network 102. Client network devices typically have some type of network interface hardware, either wired or wireless, that allows the device to connect to the internal network. Client network devices have a processor and memory for storing data and software programs. Software may include driver or API software that allows the client network device to access printer resources over the network.

External network 104 may be a private or public network that is separate from internal network 102. Typically, and as is shown in FIG. 1, external network 104 comprises the internet 112. In other embodiments, internet 112 may be replaced with other private or public networks and combinations thereof. External network 104 also includes the network components that allows external client network devices, such as external network client 114, to connect to the internet 112. This generally includes the network components of service providers that offer internet access. Examples of external network client devices include, but are not limited to, home computers connected to the internet through DSL or mobile phones connected to the internet through the cellular network.

Modern mobile phones often include both a cellular radio and a wireless LAN radio. These dual-radio phones may act as an internal network client if the wireless LAN radio is connected to internal network 102 or as an external network client if the cellular radio is providing a connection to the internet 112.

Internal network 102 and external network 104 may each have a number of printer resources connected to their respective networks. Internal printer resource 116 is connected to intranet 108 through print delivery server 118. Print delivery server 118 is typically a computer connected to internal network 102 through network interface hardware and connected to internal printer resource 116 through another interface such as USB or parallel port so that the printer resource 116 is accessible through internal network 108. In some embodiments, internal printer resource 116 may be a network printer or photocopier that incorporates the functionality of print delivery server 118. Print delivery server 118 receives print requests and translates the request for the printer resource. Print delivery server 118 may also queue print jobs, provide a mechanism to allow users to release print jobs from the queue and also provide accounting functions.

External printer resources are located on a separate network from internal network 102. External printer resource 120 is shown connected to the internet 112 for simplicity, but in practice may be connected to another internal network similar to internal network 102, but is accessible through the internet 112. External printer resource 120 may also include additional elements, such as a print delivery server (not shown).

Printer resources generally refer to devices that produce a hard copy, usually on paper, of an electronic document. Printer resources may include computer peripheral printers and network printers, and also multifunction devices such as photocopiers and fax machines that provide a printing feature.

In other embodiments, printer resources may also refer to digital ink or virtual display resources. For example, a tablet computer device or an e-reader computer may be configured with software that allows the device to receive print job data in order to display an electronic document on the device display, either automatically or with user approval.

In a hosted printer configuration systems, a global server stores printer resource data associated with each printer resource accessible through the hosted service. In the embodiment shown in FIG. 1, global server 122 stores global printer resource data in printer resource registry 124. Global printer resource registry 124 is a database and may store parameters associated with the printer resources, a print driver database for the printer resources and user registration data for accessing the printer resources.

Parameters associated with the printer resources may include a network address of the printer resource or print delivery server. Typically, the network address is a public internet IP address. The parameters may also include location information, such as geographical coordinates, that may be used by a client network device to identify the nearest printer resource. Other parameters stored in the global printer registry 124 may include data handling capabilities and pricing information of the printer resource. For example, parameters may identify whether a printer resource can perform color printing, handle a certain type of electronic file and include the cost per page. Other parameters may include further capabilities and options of the printer resources. A driver identifier may be another stored parameter that is used to identify a particular driver for a printer resource from the print driver database.

Another parameter in printer resource data may be a pseudo-name field that can be used to identify the printer resources to the users of the network clients and administrators. Preferably, the pseudo-name is a network alias that identifies the physical location and properties of the printer resource, but does not necessarily identify the network address of the printer resource.

Printer resource registry 124 may also store information used for authenticating users and access control. Usage policies including access control lists for both the entire sites and printer resources as well as print quotas may be stored in printer resource registry 124. Other data stored in printer resource registry 124 may include print release requirements and capabilities for individual printers such as requirements for release codes and passwords to release print jobs. Printer resource registry 124 may also provide authentication for users and limit access to certain users to certain groups of resources. For example, a university student user may only see printer resources that are administered by the university.

In a hosted printer configuration system, a network client device, either internal or external, may make a print request to the global server. In some embodiments, the print request may comprise print job data representing an electronic document that the global server then routes to the appropriate printer resource using the network address associated with the printer resource. A print request may also consist of a query for a list of printer resources matching user defined or system defined criteria. The global server may respond to the request with printer resource data that may be used to configure the network client device to use a printer resource.

In other embodiments of a hosted system, the print request from the network client device may be a request or query for a listing of printer resources or a request for a specific printer resource. The global server will return the appropriate network address information and the network client may then submit print job data to the printer resource directly rather than through the global server. In some cases, the network client may also need to obtain printer drivers from the global server.

The hosted printer configuration systems allow external network clients and internal network clients to send print requests to either internal printer resources or external printer resources regardless of whether the clients are on the internal or external network. For example, internal client 110 may submit print requests to external printer resource 120, or external client 114 may submit print requests to internal printer resource 116. Although the approach is convenient for the users of network client devices and for administrators to manage printer resources, the approach requires a number of requests to traverse the internet to the global server. This creates a number of inefficiencies and possible points of failure for the system.

Print traffic server 126 is connected to internal network 102 and provides more efficient printer resource access for internal network client devices, such as internal client 110. Print traffic server 126 acts as an intermediary for handling printer resource requests sent from internal clients to the global server.

In some embodiments, print traffic server 126 may operate in a mode where each print request is evaluated before it is transmitted to the global server. This may be done for logging purposes and developing consolidated reports. Advantageously, this keeps logging and reporting data on internal network 102 giving system administrators greater control and security of the data. Also, if reporting data is required at the global server, it is more efficient to send consolidated reports. In some embodiments, consolidated activity reports may be sent to the global server at regularly scheduled intervals.

In still some other embodiments, there may be multiple global servers and print traffic server 126 may evaluate the print request to determine which global server should receive the request. For example, there may be a secondary or backup global server that is used if the primary global server is not currently operational. Another example may include a case where print requests directed to a certain group of printer resources are handled by a specific instance of the global server.

In another variation of the above mode of operation of print traffic server 126, print requests may be evaluated to determine whether to route the print request to an internal printer resource or through global server 122. For example, if internal client 110 sends a print job for internal printer resource 116, print traffic server 126 will evaluate the print request and route the print request to print delivery server 118 for printing. Print traffic server 126 may route the print request based on location information in the print request.

Serving print requests from print traffic server 126 prevents sending a print request across internet 112 for printer resources located on internal network 102. Serving print requests from print traffic server 126 conserves internet bandwidth utilization and provides a faster response since the request does not need to be served by the global server. From the perspective of hosting provider of global server 122, print traffic server can reduce computational and network demands on the global server 122 thereby reducing associated hosting costs.

In some embodiments, print traffic server 126 may have an internal printer resource registry 128 that can be used to store printer resource data. In some embodiments, the internal printer resource data stored in internal printer resource registry 128 may relate to all internal printer resources on internal network 102. Print traffic server 126 may evaluate print requests based upon internal printer resource data stored in the internal printer resource registry 128 to determine whether to route a print request to an internal printer resource or global server 122.

Storing printer resource data at internal printer resource registry 128 on internal network 102 provides a number of advantages. System administrators on internal network 102 can configure all required information on global server 122 and can then download the printer resource information to the internal printer resource registry to initialize the internal printer resource data. Ongoing configuration changes could take place on either global printer resource registry 124 or internal printer resource registry 128. Changes between either registry could by synchronized at a synchronization event, such as, for example, at a scheduled interval, manual synchronization made by a system administrator or upon receiving a print request. The scheduled interval for synchronizing the registry may also be configured by an administrator.

In some embodiments, internal printer resource registry 128 may also store printer resource data of external printer resources. Print traffic server 126 may then also respond to print requests for external printer resources without consulting global server 122. In other embodiments, internal printer resource registry 128 may be limited to only storing printer resource data for printer resources that are connected to the internal network.

Print traffic server 126 may update printer resource data of external printer resources stored at the internal printer resource registry as data is requested. If, for example, print traffic server 126 receives a print request for an external printer resource and the associated printer resource data is not stored at internal registry 128, print traffic server 126 will send the print request to global server 122. Global server 122 will respond to the print request with appropriate printer resource data from global printer resource registry 124. Print traffic server 126 may then update internal printer resource registry 128 with the printer resource data from global printer resource registry 128 when responding to the print request so that future print requests may be served without requesting data from global server 122.

A systems administrator may also set up an external resource in the internal registry. In the university campus, for example, a system administrator could add the printer resource for an on-campus print shop business whose printer resources are not located on the internal network or managed by the administrator, but is nonetheless convenient for students.

When a print request is received, print traffic server 126 may evaluate the request based upon internal printer resource data stored in the internal printer resource registry. Print traffic server 126 determines whether the print request may be served using the internal printer resource data or whether printer resource data needs to be retrieved from global server 122.

In some embodiments, print traffic server 126 may operate in a standalonce mode once the internal printer resource registry 128 has all the data required to serve print requests from the internal network. All usage and administration may remain local to the internal network and the system does not report back to the global server 122. The standalone mode may also be a fail-safe mode of operation that the print traffic server 126 resorts to if either the internet connection or global server 122 are unavailable. In the standalone mode, the global server 122 may act as a backup for printer resource data stored in internal registry 128.

Figure 2:
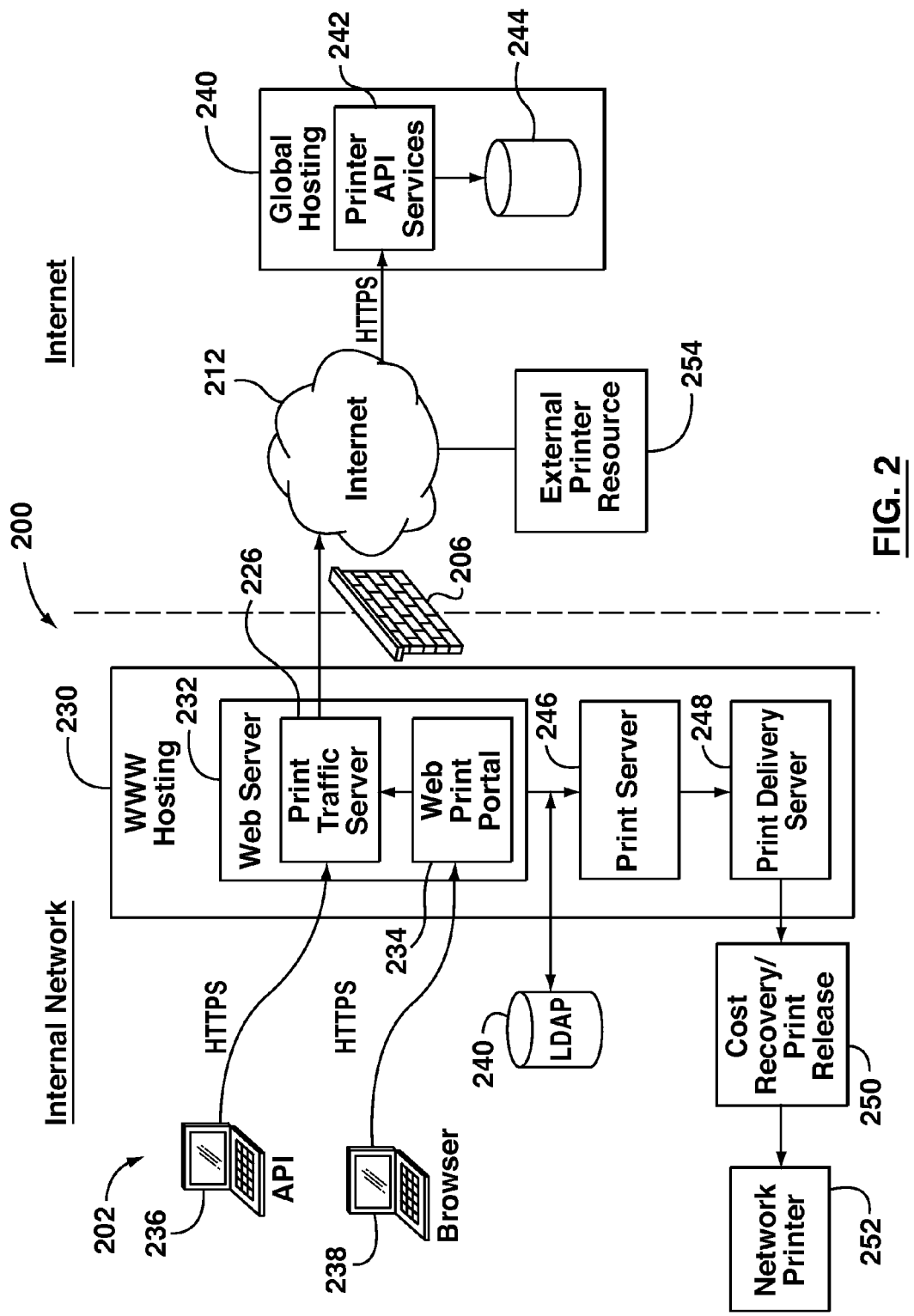
FIG. 2 is a block diagram of a network system for accessing printer resources through internal web hosting and the internet.

Referring to FIG. 2, a network system 200 is shown with internal network 202 of an organization having internal organization web hosting 230 providing access to internet 212 through firewall 206. Print traffic server 226 may be implemented as a web service running on web server 232. For example, web server 232 may be configured as an Apache Tomcat server and print traffic server 226 may be implemented as a java servelet.

Network client device 238 may be configured to send print requests using a specially configured API on the network client device 238. In some embodiments, the API may be implemented as print driver software that also allows users to select a printer resource. The API may provide for communication with print traffic server 226 through a secure protocol, such as HTTPS or other SSL/TLS-based protocols.

Web server 232 may also provide a web print portal 234 that allows users to send print requests via a web browser. Network client computer 238 running web browser software may connect to intranet web print portal 234 that provides a secure web page interface for receiving print requests. The web print portal may accept electronic documents and allow a user to specify a printer resource along with appropriate settings. Web print portal 234 can present the network client computer 238 an authentication challenge that can be verified through the organization's LDAP directory 240. Other known authentication approaches may also be used. Some embodiments may authenticate user credentials through services provided by global hosting 240.

Web print portal 234 forwards received print requests to print traffic server 226. The print requests are either served by print traffic server 226 through print traffic server's internal printer resource registry or the request is sent over internet 212 to global hosting provider 240. In some embodiments, either web print portal 234 or print traffic server 226 may translate the print request from the web print portal 234 into the format supported by the API. Print requests forwarded to the global hosting provider 240 are served by printer API services 242. External printer resource registry 244 stores global printer resource data and is used by printer API services 242 for providing the appropriate printer resource data when serving print requests.

When a print request from network client devices 236, 238 are received by the print traffic server 226, the internal resource registry of the print traffic server is consulted to determine if the registry contains the appropriate printer resource data to serve the request. If the print request is a print job for a printer connected to internal network 102, such as network printer 252, the print traffic server will forward the print job through print server 246 and print delivery server 248.

Print server 246 will ensure the print job is transformed into printable data. Print server 246 works in conjunction with the API request from the client to render the print job. Once the print job data is in a printable form, print server 246 to the print delivery server 248. Print delivery server 248 is then responsible for communicating with the printer or print server to submit the print job to the actual printer. Print server 246 and print delivery server 248 are shown within web hosting block 230 for example purposes only. In other embodiments, the print server 246 and print delivery server 248 may both be located on separate hardware somewhere else on the internal network.

In some embodiments, the network printer may be associated with a cost recovery or print release module 250. For example, either the network printer or a computer attached to the network printer may have a mechanism for collecting payment for the print jobs. The mechanism may accept coins, bills or any payment card. Other embodiments may also include a print release module that allows a user to release their print job from the print queue to the printer. For example, when the print job is submitted, either through a web browser or the API, the user may provide, or be provided with, a release code that the user enters at the print release module to release their print job from the queue.

Figure 3:
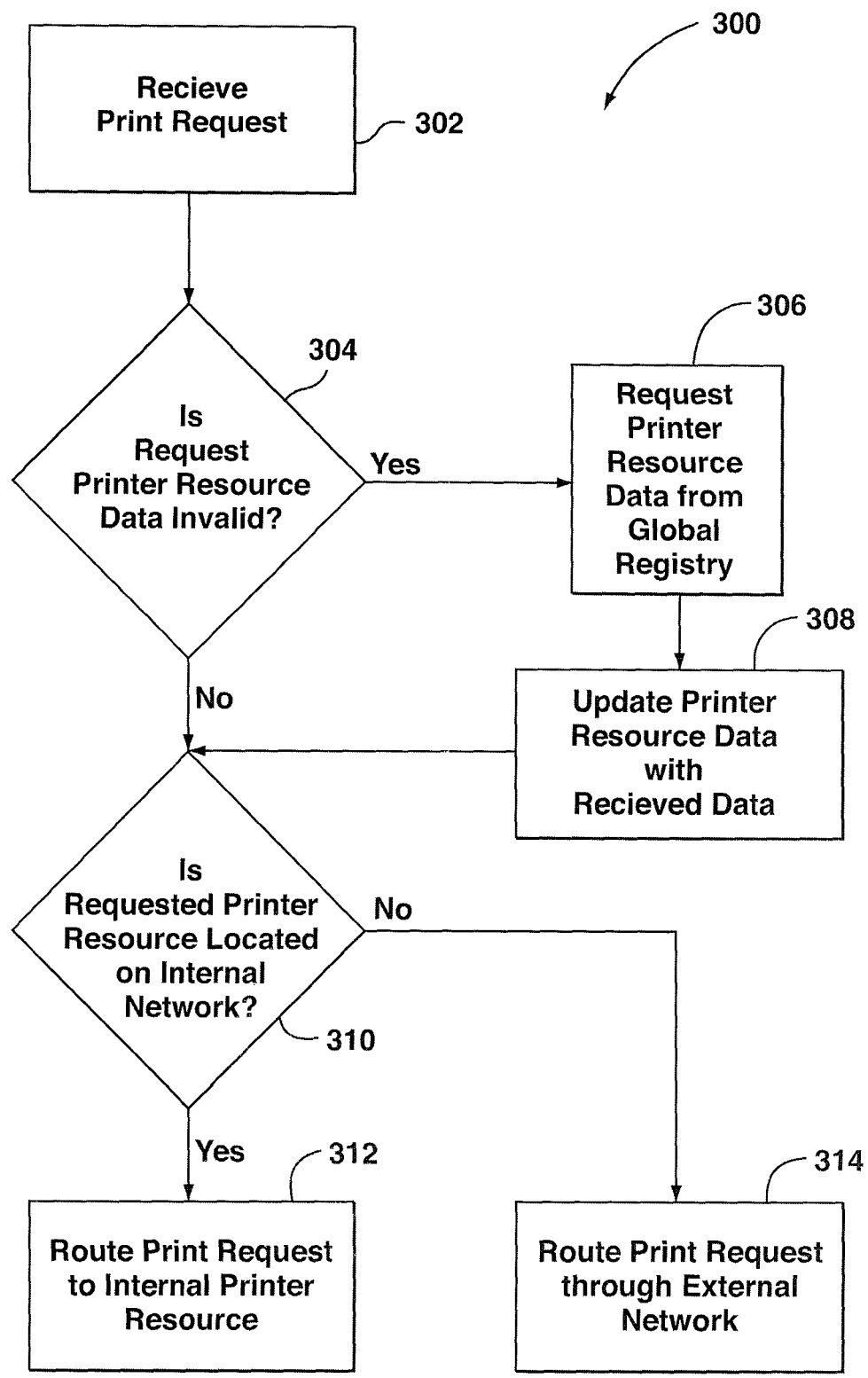
FIG. 3 is a flow chart diagram illustrating steps of a method for routing print requests and managing printer resource data.

Referring now to FIG. 3, shown is a flow chart diagram illustrating steps of a method 300 for routing print requests and managing printer resource data in one exemplary embodiment. At least some of the steps of method 300 are performed by an application executing on a computing device or server. For example, print traffic servers 126 and 226 from FIGS. 1 and 2 may be configured to execute the steps of method 300.

First, at step 302, a print request is received at the computing device or server. Next, at step 304, the print request is evaluated to determine whether printer resource data stored at the server's internal printer resource registry is invalid. Printer resource data stored in the internal registry is used to serve the print request. Invalid printer resource data may indicate that there is no database entry for the requested printer resource data. The printer resource data may also be invalid if the printer resource data is stale. For example, if the requested printer resource has not been updated for more than 24 hours, it may be assumed to be stale and invalid.

In some embodiments, there may be a flag associated with printer resource data and the flag may indicate whether the printer resource data is invalid. The flag may be set by the print traffic server by certain events or may be manually set by a systems administrator. An example of an event that causes the flag to be set may include a message from the global server indicating that the printer resource is unavailable. A systems administrator may want to set the flag to cause the internal registry to refresh its printer resource data from the global server.

In other embodiments, the print request may also be evaluated so that important parameters in the print request may be stored at the internal registry. For example, an API call from a network device may contain a request for a parameter about a certain printer resource and the internal registry may store the request for the parameter as well as the response. In the future, when the same parameter is requested in an API call, the print traffic server may consult the internal registry to determine if it already knows the response to the API call and respond to the network client using the data stored in the internal registry rather than making a an API call to the global server.

If printer resource data that is required to serve the request is invalid or not available, printer resource data is requested from a global registry that has global printer resource data at step 306. The server updates the internal printer resource data with the data received from the global registry at step 308.

In some embodiments, the print request may be an API request and the API request may simply be forwarded to the global registry. In some cases, the API request may be re-interpreted by the print traffic server and alterred before sending to the global registry. The original API request may be alterred in cases where some of the printer resource data to serve the request is available on the internal network and a limited request must be made to the global registry.

At step 310, it is determined whether a requested printer resource is located on the internal network to which the server is connected. Printer resource data associated with the print request may be evaluated to determine if the resource is located on the internal network. Printer resource data may include location information such as a network address or a physical location. In other embodiments, location information may specify a group indicator where all printer resources in the group are located on the internal network.

If the printer resource is located on the internal network, the print request is routed to the internal printer resource in step 312. If the printer resource is not located on the internal network, the print request is routed through the external network in step 314. In some embodiments, routing the print request externally may direct the print request to a network address of a printer resource that is located on an external network, such as the internet. In other embodiments, print requests for printer resources that are not located on the internal network may be routed to a global server that is located on an external network.

Figure 4:
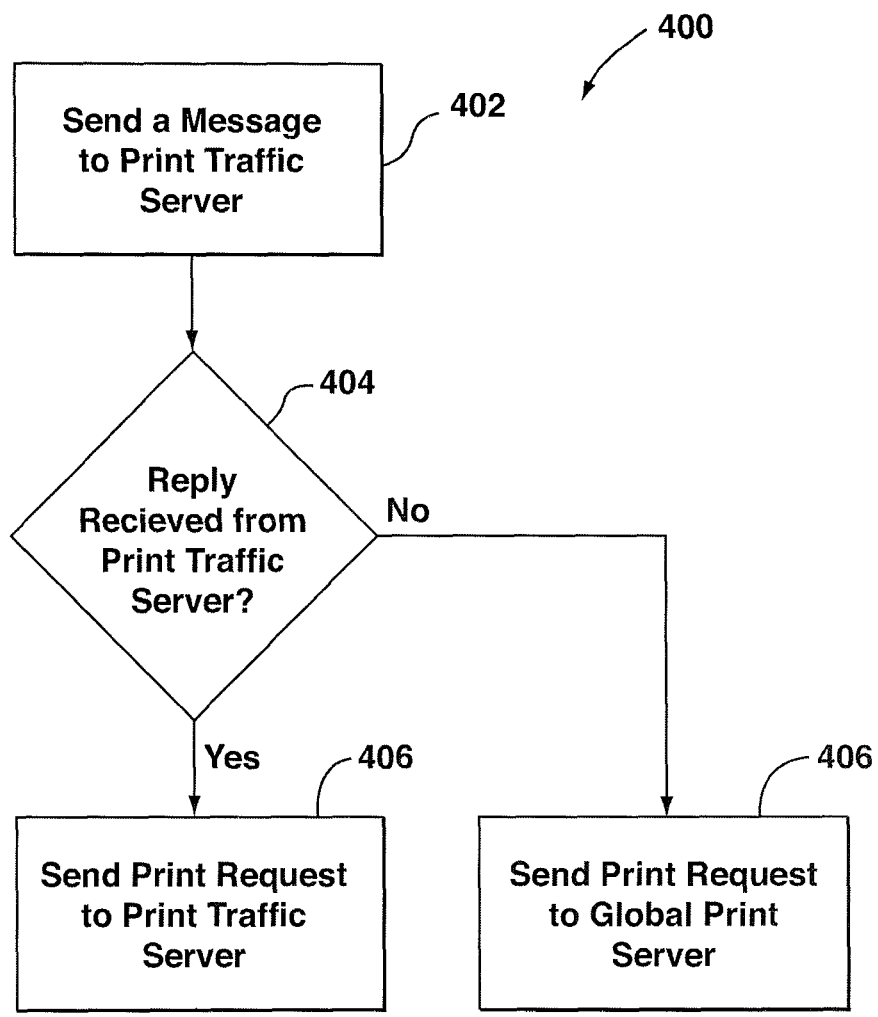
FIG. 4 is a flow chart diagram illustrating steps of a method for requesting a printer resource through a print traffic server from a client network device.

Referring now to FIG. 4, shown is a flow chart diagram illustrating a method 400 for requesting a printer resource through a print traffic server from a client network device. The steps shown in method 400 may be performed by a processor executing an application stored in memory of a network client device. In some embodiments, method 400 is used to determine whether network client device is connected to an internal network with a print traffic server.

At step 402, a message is sent to a print traffic server. In some embodiments, the client device may be configured with a network address for the print traffic server and the message is sent to the network address. In some embodiments, the message may be in the form of one or more ICMP echo request packets that are sent to the configured network address of the print traffic server.

Next, at step 404, the network client device determines whether a reply is received from the print traffic server. The client device may wait for a certain timeout period before making this determination. If a reply is received from the print traffic server, the client network device may then send a print request to the print traffic server in step 406. The preference to use a print traffic server located on an internal network provides improved performance and efficiency over using a global server on a more remote network.

Failing to receive a reply from the print traffic server may serve as an indication to the network client device that the device is not currently connected to a network where a print traffic server is accessible. If this is the case, the print request may be sent to a global print server at step 408. Typically, the global server is on the internet and the network client device has internet access.

In some embodiments, the client network device may have a GPS receiver and the device may use GPS coordinates to determine whether the network device is within a coverage area of an internal network with a print traffic server. In other embodiments, the client network device may use other approaches to determine device location including, but not limited to, multilateration, trilateration and triangulation with wireless radios such as a cellular radio, or other methods that rely on proximity to cell phone towers or wireless LAN access points.

In other embodiments, the network address obtained by the client network device may provide a type of location information. For example, if the client network device connects to a LAN that assigns the device an IP address in a certain range, the device may heuristically associate certain IP addresses with a certain location, internal network or print traffic server. A network device may also associate a wireless LAN SSID with an internal network and print traffic server.

Figure 5:
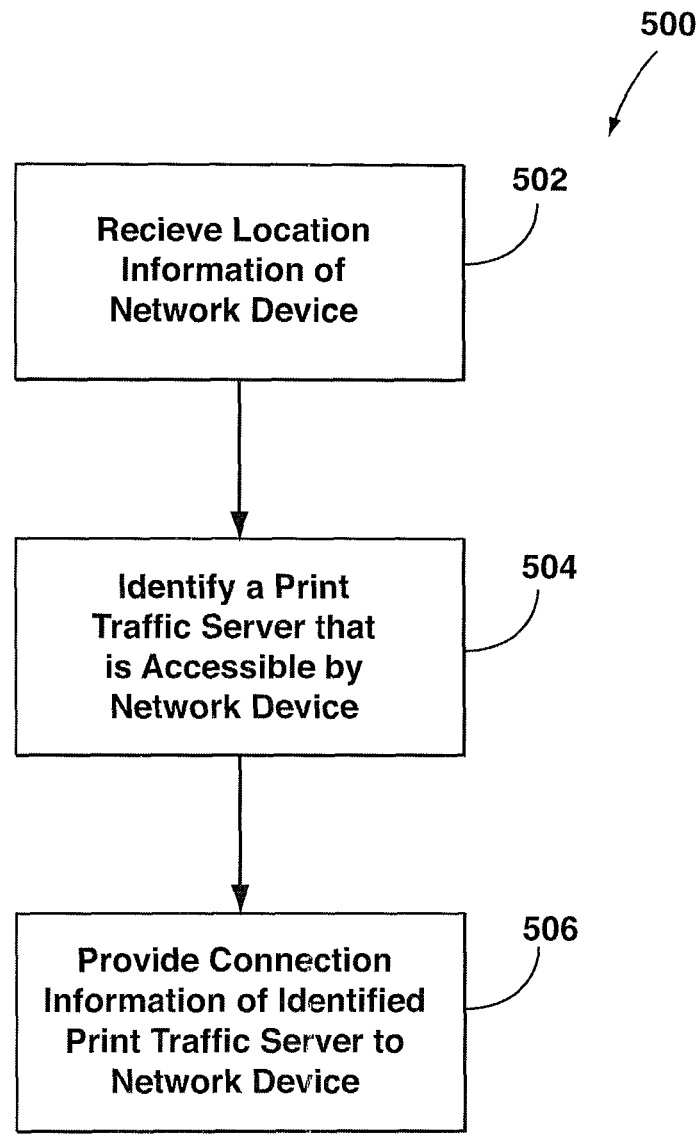
FIG. 5 is a flow chart diagram of illustrating steps of a method for providing a client network device with connection information for a print traffic server.

Referring now to FIG. 5, shown is a flow chart diagram of method 500 for providing a client network device with connection information for a print traffic server. The steps shown in method 500 may be performed by a processor executing an application stored in memory of a server.

At step 502, location information is received from a network device. The location information may include any type of information that may be used to approximate the nearest print traffic server. Location information may include GPS location data or network data such as, for example, wireless LAN SSID and signal strength, internal LAN network address or a public internet IP address.

Next, at step 504, the location information is evaluated to identify a print traffic server that may be accessible by the network device. In other embodiments, a number of possible print traffic servers may be identified. In an embodiment where GPS coordinates are evaluated, the determination may be based on proximity to a print traffic server or an access point on an internal network to which the print traffic server is connected. In other embodiments, a print traffic server may be associated with requests that come from a certain range of public IP addresses.

Connection information of an identified print traffic server is then provided to the network device that made the request in step 506. The connection information typically takes the form of an IP address, and in some embodiments may include further details about the print traffic server, such as the owner or administrator, whether it is public or private and the type of authentication required. Connection information may also include any information that the network device may require to negotiate a connection with the print traffic server. If the network device is located on the internal network of the print traffic server, then an internal or private IP address may be provided.

In some embodiments, a list of print traffic servers may be provided that is ordered based on the provided location information. The network device may attempt to connect in order to each print traffic server on the list, or in other embodiments, the user of the network device may be able to select desired print traffic server.

In other embodiments, when print traffic server 126 is acting as an intermediary for print requests that are sent to the global server 122 there may be no additional configuration required for client network devices. For example, a client network device may be configured to always contact the global server 122, but internal network may be configured to route all request, such as those using a certain protocol and destined for an IP address of the global server, to print traffic server 126. Print traffic server 126 will then serve the print requests. This type of configuration is seamless to a client network device since when they are on the internal network the print request will be served by print traffic server 126 that intercepts the print requests, and when the client network device is connect to an external network the print requests will be served by global server 122.

Figure 6:
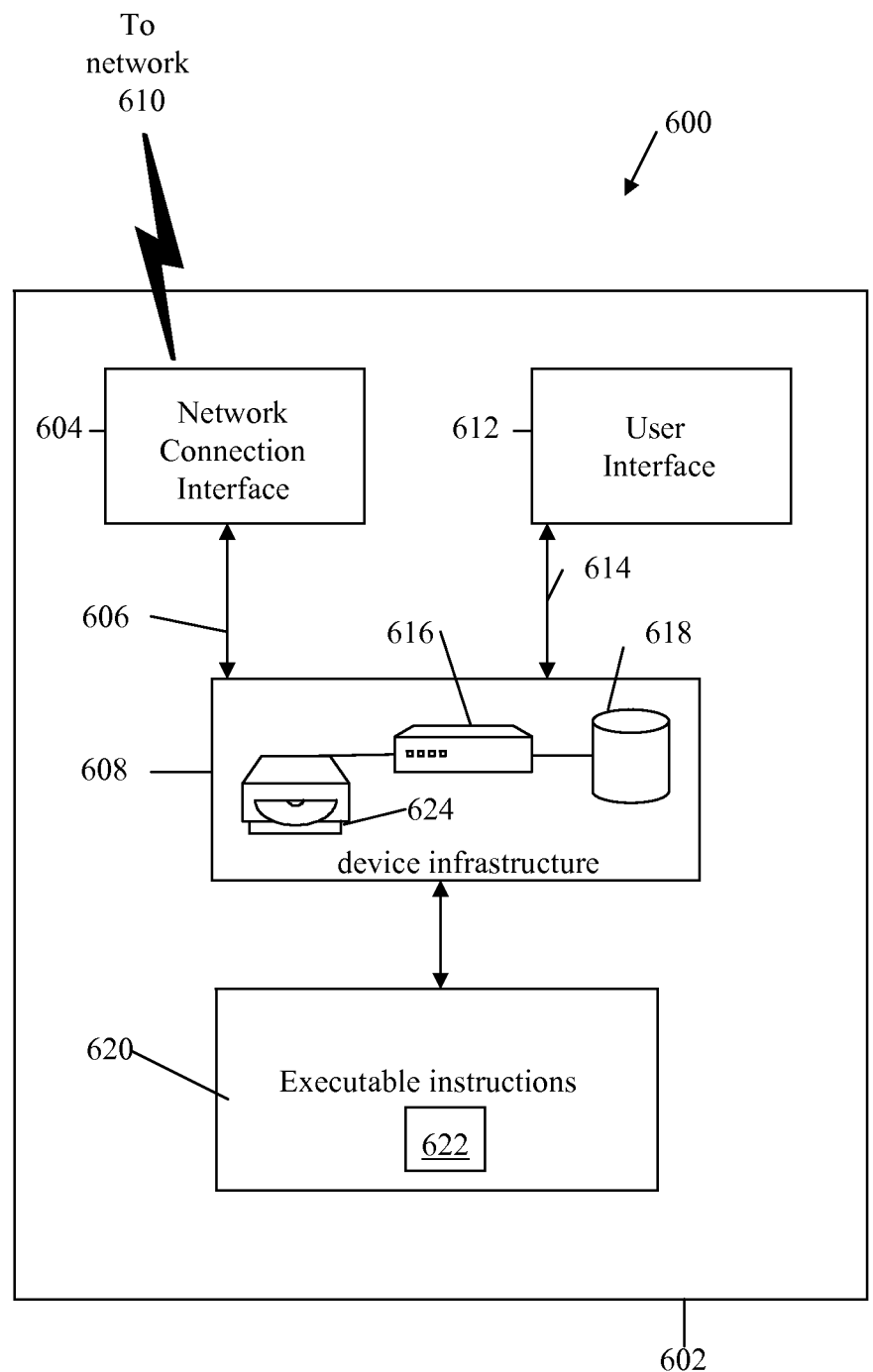
FIG. 6 is a block diagram showing a computing device in a host system.

Referring to FIG. 6, shown is a block diagram of a computing device 602 in a host system 600. Network client devices, various servers and network printers, such as those shown in FIGS. 1 and 2, may be implemented as an embodiment of host system 600 comprising one or more computing devices 602. Computing device 602 may also be used to carry out the methods shown in FIGS. 3 through 5.

Computing device 602 can include a network connection interface 604, such as a network interface card or a modem, coupled via connection 606 to a device infrastructure 608. The network connection interface 604 is connectable during operation of the devices 602 to the network 610 (e.g. an intranet and/or an extranet such as the Internet), which enables the devices 602 to communicate with each other (e.g. that of an internal network client device 110 with print traffic server 126) as appropriate. The network 610 can support the communication of the print requests for printer resources, including print job data.

Referring again to FIG. 6, the device 602 can also have a user interface 612, coupled to the device infrastructure 608 by connection 614, to interact with a user (e.g. administrator—not shown). The user interface 612 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 608.

Referring again to FIG. 6, operation of the device 602 is facilitated by the device infrastructure 608. The device infrastructure 608 may include one or more computer processors 616 and can include an associated memory 618 (e.g. a random access memory). The computer processor 616 facilitates performance of the device 602 configured for the intended task (e.g. of the respective module(s) of the print traffic server 126) through operation of the network interface 604, the user interface 612 and other application programs/hardware 620 (e.g. decisioning module 622) of the device 602 by executing task related instructions. These task related instructions can be provided by an operating system, and/or software applications 620 located in the memory 618, and/or by operability that is configured into the electronic/digital circuitry of the processor(s) 616 designed to perform the specific task(s). Further, it is recognized that the device infrastructure 608 can include a computer readable storage medium 624 coupled to the processor 616 for providing instructions to the processor 616 and/or to load/update the instructions 620. The computer readable medium 624 can include hardware and/or software such as, by way of example only, magnetic disks, magnetic tape, optically readable medium such as CD/DVD ROMS, and memory cards. In each case, the computer readable medium 624 may take the form of a small disk, floppy diskette, cassette, hard disk drive, solid-state memory card, or RAM provided in the memory module 618. It should be noted that the above listed example computer readable mediums 624 can be used either alone or in combination.

Further, it is recognized that the computing device 602 can include the executable applications 620 comprising code or machine readable instructions for implementing predetermined functions/operations including those of an operating system (e.g. modules of print traffic server 126 or network client device to carryout methods shown in FIGS. 3 through 5). The processor 616 as used herein is a configured device and/or set of machine-readable instructions for performing operations as described by example above. As used herein, the processor 616 may comprise any one or combination of, hardware, firmware, and/or software. The processor 616 acts upon information by manipulating, analyzing, modifying, converting or transmitting information for use by an executable procedure or an information device, and/or by routing the information with respect to an output device. The processor 616 may use or comprise the capabilities of a controller or microprocessor, for example. Accordingly, any of the functionality of the host system 600 (e.g. modules) may be implemented in hardware, software or a combination of both. Accordingly, the use of a processor 616 as a device and/or as a set of machine-readable instructions is hereafter referred to generically as a processor/module for sake of simplicity. Further, it is recognised that the host system 600 can include one or more of the computing devices 602 (comprising hardware and/or software) for implementing the modules, as desired.

It will be understood in view of the above that the computing devices 602 of the network client devices, servers and network printer resources may be, for example, personal computers, personal digital assistants, mobile phones, network printers and servers, or combinations thereof. Further, it is recognised that each server-computing device 602, although depicted as a single computer system, may be implemented as a network of computer processors, as desired.

Further, it will be understood by a person skilled in the art that the memory/storage 618 described herein is the place where data can be held in a form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 618 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 618 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 618 can also be defined as an electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A method for routing print requests and managing internal printer resource data on an internal network wherein global printer resource data is stored on an external network, the method comprising:
   receiving a print request for a printer resource by a local server located on the internal network;
   updating by the local server internal printer resource data with global printer resource data obtained from a global server connected to the external network if the internal printer resource data stored on the internal network that is associated with the requested printer resource is invalid, the local server separated from the global server by a firewall; and
   routing the print request to the requested printer resource based on location information in the printer resource data associated with the requested printer resource.

2. The method of claim 1 wherein routing the print request further comprises determining whether to send the print request through the internal network via the local server if the location information indicates the printer resource is connected to the internal network, or send the print request through the external network via the global server if the location information indicates the printer resource is not connected to the internal network.

3. The method of claim 2 wherein the location information comprises at least one of a network address or a physical location.

4. The method of claim 2 further comprises synchronizing the printer resource data between the internal printer resource data on the internal network and the global printer resource data on the global server at a synchronization event.

5. The method of claim 4 wherein the synchronization event is at least one of a scheduled interval, the print request or a manual synchronization.

6. The method of claim 1 wherein the print request comprises a request for a listing of printer resources.

7. The method of claim 1 wherein the print request comprises print job data.

8. The method of claim 1 further comprising sending a consolidated activity report to the global server at a scheduled interval.

9. The method of claim 1 further comprising initializing internal printer resource data global printer resource data received from the global server.

10. The method of claim 1 wherein the invalid internal printer resource data comprises stale internal printer resource data.

11. A system for routing a print request to a requested printer resource and managing internal printer resources on an internal network wherein global printer resource data is stored on an external network, the system comprising:
   a global server located on the external network having a global printer resource registry for storing the global printer resource data;
   a print traffic server located on the internal network and connected to the global server via the external network, the print traffic server having an internal printer resource registry for storing internal printer resource data, the print traffic server configured to update the internal printer resource data using the global printer resource data obtained from the global server if the internal printer resource data associated with the requested printer resource is invalid, and to route the print request received by the print traffic server to the requested printer resource based on location information in the printer resource data associated with the requested printer resource, the print traffic server separated from the global server by a firewall.

12. The system of claim 11 wherein the print traffic server is further configured to determine whether to send the print request through the internal network via the print traffic server if the location information indicates the printer resource is connected to the internal network or to send the print request through the external network via the global server if the location information indicates the printer resource is not connected to the internal network.

13. The system of claim 12 wherein the location information comprises at least one of a network address or a physical location.

14. The system of claim 12 wherein the print traffic server is further configured to synchronize the printer resource data between the internal printer resource registry and the global printer resource registry at a synchronization event.

15. The system of claim 14 wherein the synchronization event is at least one of a scheduled interval, the print request and a manual synchronization.

16. The system of claim 11 wherein the print request comprises a request for a listing of printer resources.

17. The system of claim 11 wherein the print traffic server is further configured to send a consolidated activity report to the global server at a scheduled interval.

18. The system of claim 11 wherein the print traffic server is further configured to initialize the internal printer resource registry with the global printer resource data from the global printer resource registry.

* * * * *